(12) United States Patent
Klassen (10) Patent No.: US 11,097,763 B1
(45) Date of Patent: Aug. 24, 2021

(54) SLED FOR USE IN ASSOCIATION WITH A WASTE CONTAINER

(71) Applicant: Doug Klassen, Holland, MI (US)

(72) Inventor: Doug Klassen, Holland, MI (US)

( * ) Notice: Subject to any disclaimer, the term of this patent is extended or adjusted under 35 U.S.C. 154(b) by 0 days.

(21) Appl. No.: 17/012,220

(22) Filed: Sep. 4, 2020

(51) Int. Cl.
*B62B 13/02* (2006.01)

(52) U.S. Cl.
CPC .................. *B62B 13/02* (2013.01)

(58) Field of Classification Search
CPC .......... B62B 19/00; B62B 19/02; A63C 17/18
USPC ....................................... 280/7.12, 9, 10, 11
See application file for complete search history.

(56) References Cited

U.S. PATENT DOCUMENTS

| | | | |
|---|---|---|---|
| 769,625 A | 10/1903 | Parks | |
| 1,406,207 A * | 2/1922 | Miller | B62B 13/18 280/13 |
| 1,873,690 A | 7/1931 | Ward | |
| 2,443,699 A * | 6/1948 | Swain | B62B 19/02 280/13 |
| 2,589,602 A * | 3/1952 | Clark | B62B 19/02 280/13 |
| 3,463,502 A * | 8/1969 | Gough | B62B 13/18 280/8 |
| 3,561,777 A * | 2/1971 | Geis | B63B 1/14 280/7.12 |
| 3,718,337 A | 2/1973 | Vosbikian et al. | |
| 3,774,926 A * | 11/1973 | Chase | B62B 19/02 280/13 |
| 3,806,146 A * | 4/1974 | Shaw | B62B 19/04 280/7.12 |
| 3,845,968 A | 11/1974 | Larson | |
| 4,116,455 A * | 9/1978 | Dotson | A63C 5/031 280/13 |
| 4,161,323 A * | 7/1979 | Wetteland | A63C 5/031 280/13 |
| 4,163,564 A * | 8/1979 | Kramer | B62B 5/025 280/10 |
| 4,191,391 A * | 3/1980 | Dorlini | B62B 13/18 280/11 |
| 4,194,753 A * | 3/1980 | Schrishuhn, Jr. | A63C 17/26 280/13 |
| 4,251,085 A * | 2/1981 | Lageer | B62B 13/18 280/10 |
| 4,307,892 A * | 12/1981 | Miles | B62B 13/18 280/9 |
| 4,313,612 A | 2/1982 | Rubens | |
| 4,360,210 A * | 11/1982 | Osting | B62B 19/02 280/13 |
| 4,577,876 A * | 3/1986 | Harris | B62B 19/02 280/13 |
| 4,589,668 A * | 5/1986 | Mares | B62B 13/18 280/10 |

(Continued)

FOREIGN PATENT DOCUMENTS

WO   WO 2018/129316   7/2018

*Primary Examiner* — Jeffrey J Restifo
(74) *Attorney, Agent, or Firm* — King & Partners, PLC (57) ABSTRACT

A sled for use in association with a waste container having a handle that enables a user to conveniently transport the waste container during snowy and/or inclement weather conditions, including a first ski, wherein the first ski includes a top surface, a bottom surface, a front end, and a back end; and a wheel binding associated with the top surface of the first ski, wherein the wheel binding is adapted to releasably secure a wheel of a waste container.

12 Claims, 6 Drawing Sheets

(56) References Cited

U.S. PATENT DOCUMENTS

| | | | |
|---|---|---|---|
| 4,618,157 A | 10/1986 | Resnick | |
| 4,778,190 A * | 10/1988 | Meredith | B62B 13/18 |
| | | | 280/13 |
| 5,000,467 A | 3/1991 | Becca | |
| 5,110,147 A | 5/1992 | Gershman | |
| 5,407,217 A * | 4/1995 | Lambert | B62B 19/02 |
| | | | 280/10 |
| 5,413,361 A * | 5/1995 | Mosher | B62B 19/02 |
| | | | 280/13 |
| 5,427,390 A * | 6/1995 | Duncan | B62B 19/02 |
| | | | 280/13 |
| 5,704,625 A | 1/1998 | Presnell et al. | |
| 5,860,659 A | 1/1999 | Hart | |
| 6,454,281 B1 | 9/2002 | Pearson | |
| 6,474,660 B1 * | 11/2002 | Warren | B62K 3/002 |
| | | | 280/14.25 |
| 6,682,082 B1 * | 1/2004 | Dalen | B60P 3/36 |
| | | | 280/10 |
| 6,708,989 B1 * | 3/2004 | Braun | A63C 5/085 |
| | | | 280/13 |
| 6,923,468 B1 * | 8/2005 | Barnett | B62B 3/04 |
| | | | 280/35 |
| 6,981,705 B1 * | 1/2006 | Jolley | B62B 13/06 |
| | | | 280/13 |
| 8,418,792 B2 * | 4/2013 | Rivard | B62B 19/02 |
| | | | 180/183 |
| 8,814,179 B1 * | 8/2014 | McCormick | B62B 19/02 |
| | | | 280/13 |
| 8,851,485 B2 * | 10/2014 | Bach | B62K 13/00 |
| | | | 280/13 |
| 8,857,822 B1 * | 10/2014 | Schultz | B62B 13/18 |
| | | | 280/9 |
| 8,915,501 B2 * | 12/2014 | Forcier | B62B 13/18 |
| | | | 280/11 |
| 9,027,939 B2 * | 5/2015 | Love | B62B 9/00 |
| | | | 280/13 |
| 9,139,216 B1 * | 9/2015 | Rivard | B62B 13/18 |
| 9,481,388 B2 * | 11/2016 | Dondurur | A45C 5/14 |
| 9,540,029 B1 * | 1/2017 | Farina | B62B 19/02 |
| 9,950,732 B1 * | 4/2018 | Patterson | B62B 19/02 |
| 10,023,220 B1 * | 7/2018 | Samuelian | B62B 19/02 |
| 10,384,868 B1 | 8/2019 | Poulopoulos | |
| 2010/0230920 A1 | 9/2010 | Thibault | |
| 2011/0049823 A1 | 3/2011 | Coats | |

* cited by examiner

SLED FOR USE IN ASSOCIATION WITH A WASTE CONTAINER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to sleds and, more particularly, to sleds for use in association with waste containers. The sleds of the present invention are configured to enable a user to conveniently transport a waste container during snowy and/or inclement weather conditions without having to drag or plow the waste container through the snow. In addition, the sleds of the present invention are compact, low-profile, and utilize the handle of the waste container to facilitate transportation of the same.

2. Background Art

Sleds and carriers have been known in the art for years and are the subject of a plurality of patents and publications, including: U.S. Pat. No. 10,384,868 entitled "Trash Can Stabilizer," U.S. Pat. No. 6,454,281 entitled "Bucket Truck," U.S. Pat. No. 5,860,659 entitled "Carrier for Holding and Transporting Containers," U.S. Pat. No. 5,704,625 entitled "Trash Container Carrier," U.S. Pat. No. 5,110,147 entitled "Highly Stable, Continuously Adjustable Trash Can Transporter," U.S. Pat. No. 5,000,467 entitled "Trash Can Caddy and Method of Use," U.S. Pat. No. 4,618,157 entitled "Beach Hand Cart," U.S. Pat. No. 4,313,612 entitled "Convertible Trash Container Carrier," U.S. Pat. No. 4,307,892 entitled "Interchangeable Runners and Wheels Assemblage for Hand Trucks," U.S. Pat. No. 3,845,968 entitled "Wheeled Carrier for Refuse Containers," U.S. Pat. No. 3,718,337 entitled "Universal Wheeled Cart," U.S. Pat. No. 1,873,690 entitled "Can or Pail Hand Truck," U.S. Pat. No. 769,625 entitled "Combined Bag Holder and Truck," United States Patent Application Publication Number 2011/0049823 entitled "Device for Moving Large Containers," United States Patent Application Publication Number 2010/0230920 entitled "Wheeled Container Platform for a Single Bucket," and International Application Publication Number WO 2018/129316 entitled "Container Transporter and Methods"—all of which are hereby incorporated herein by reference in their entirety including all references cited therein.

U.S. Pat. No. 10,384,868 appears to disclose a trash can stabilizer which can be mounted on the ground and includes flexible arms on a fixed vertical support. The support includes a base leg composed of at least two flat plates adapted to be slid along a track built on the base leg; an adjustable back plate; and at least two support bars in direct communication with the base leg and the back plate. The stabilizer includes at least two arcuate shaped flexible arms adapted to effectively hold and stabilize a trash can or the like wherein the arcuate shaped flexible arms are in direct communication with and extending horizontally from the back plate and wherein the flexible arm can conform to any shape or size of a trash can or the like such that the flexible arm can securely keep the trash can in place and thereby stabilize the trash from tipping or being knocked over.

U.S. Pat. No. 6,454,281 appears to disclose a utility tool cart that is designed for carrying tools and equipment around work environments such as construction sites. The utility tool cart is a hand cart that is particularly adapted to carry equipment over long distances and/or difficult terrain. The utility tool cart contains a pair of wheels near the bottom thereof, a first support unit for holding a first tool container, a second support unit for holding a second tool container and a telescoping shaft having a hand grip.

U.S. Pat. No. 5,860,659 appears to disclose a carrier or cart for holding and transporting two or more containers, in particular, garbage/trash cans or bins. The cart is designed for easy maneuverability to facilitate storage and simultaneous transport of multiple containers.

U.S. Pat. No. 5,704,625 appears to disclose a carrier that includes a platform body for supporting a refuse container having a base, first and second side walls and a generally tapered front wall; and including interlocking members which assist in securing together the carrier and a like carrier, wherein the interlocking members may be separated in response to pressure on a foot pedal secured to the carrier.

U.S. Pat. No. 5,110,147 appears to disclose a transporter for carrying trash cans or bins that includes a mainly circular platform which is provided preferably with three radially extending slots. Holding and guide rods or plates are mounted so as to extend vertically up through the slots, preferably to a height of at least one-fifth of the diameter of the platform. The holding rods or plates are continuously adjustable in the radial direction. The holding plates may either be curved in order to provide firm surface contact with the outer surface of a mainly cylindrical trash can, or may be angled so that two of the holding plates securely hold the trash bin along two corner edges, with the third angled holding plate providing double line contact along an opposite side of the trash bin. When using holding plates, the platform is provided with raised regions and ridges to provide lateral and radial stability to the plates. Two or more transporters may be coupled using a preferably single-strand connecting member, the ends of which fit into coupling holes provided in the platforms of adjacent transporters. By coupling several transporters, several trash cans or bins may be moved at the same time as a train.

U.S. Pat. No. 5,000,467 appears to disclose a trash can transporting apparatus and method of use having a spring-loaded hook assembly and an upper support bracket, each adjustably secured to a main shaft by a level adjustment lock, the hook assembly including a spring-loaded hook having an upward facing plurality of fingers for grasping a reinforced peripheral rim of a trash can container seated on a stabilizing basket connected to the main shaft while a trash can closure lid is intact, the combination improving the stability and the transporting efficiency of the apparatus. The hook assembly and upper support bracket are adjustable along the vertical dimension of the main shaft for accommodating various sized household plastic trash can containers. When not in use, the apparatus can be displayed, shipped, stored, or transported by disassembling the various components including the main shaft, each comprised of a high-strength plastic.

U.S. Pat. No. 4,618,157 appears to disclose a manually operated collapsible hand truck for carrying supplies to and from and across the beach which has wheels independently mounted on raised front tips of skis. Skis are rigidly attached to base of the hand cart. Nominally upright frame is pivotably connected to front of cart base. Hand cart frame is locked into position relative to the base by moveable locking pin and entire hand cart may be tilted for rolling across hard pavement. Hand cart frame is temporarily unlocked from base for sliding transport of hand cart upon skis across soft sand.

U.S. Pat. No. 4,313,612 appears to disclose a trash container carrier that is convertible from a wheeled transporting to a ground supported structure. The carrier includes a wheel assemblage retractable within openings in the floor adjacent to the corners of the structure. A pair of upright members installed at opposite ends of the floor support a longitudinally extending arm. The arm rotatably connected to one member and freely supported by the other has a trash container lid secured to the underneath side. The lid is arranged to uncover a floor supported trash container when the arm is raised to load or unload the container.

U.S. Pat. No. 4,307,892 appears to disclose an assemblage for hand trucks which provides for interchangeable runners and wheels, as desired, to move the hand truck over a particular surface. The assemblage has a support frame which may be releasably secured to the frame of a hand truck and a supporting means which is releasably secured to the support frame to permit movement with respect thereto. The supporting means may be manipulated to rotate runners or wheels into contact with a surface while simultaneously rotating the wheels or runners out of contact with the surface. The support means may be releasably locked in position with respect to the support frame to ensure contact of the wheels or runners with the surface over which the hand truck is moved.

U.S. Pat. No. 3,845,968 appears to disclose a collapsible wheeled carrier for refuse containers in the general form of a hand truck and having securing means attachable, selectively, to handle portions of standard metal or molded plastic trash containers. Auxiliary attachment means is also provided for circumferentially supporting the open end of a plastic trash bag for convenient use and transportation from place to place in lieu of metal or molded plastic refuse containers.

U.S. Pat. No. 3,718,337 appears to disclose a lightweight wheeled cart which comprises a generally U-shaped tubular body terminating forwardly in a pair of vertical receiving sockets and rearwardly in a U-shaped handle to define a carrying space therebetween, holding attachments adaptable for seating within the sockets and designed to connect to the sockets to permit the cart to be used with bags of various sizes.

U.S. Pat. No. 1,873,690 appears to disclose a can or pail hand truck. The primary object of the invention is a truck wherein one or several cream or milk cans or pails can be automatically raised thereon and transported from one point to another without liability of the falling of either or both of the cans or pails from the truck during transportation.

U.S. Pat. No. 769,625 appears to disclose a bag-holder and truck. The object of the invention is to provide a truck carrying a bag-holder which can be placed in position for receiving a bag and holding the same in position to be filled upon the truck.

United States Patent Application Publication Number 2011/0049823 appears to disclose devices and methods of using such devices to move containers. A device may include a first piece with a wheel adjacent one end and a second piece attached to the first piece at a pivotal connection. The second piece may include a lift portion on one side of the pivotal connection and a handle on an opposite side of the pivotal connection. The handle may be adapted to be pivoted about an axis of the pivotal connection to cause the lift portion to lift a portion of the container.

United States Patent Application Publication Number 2010/0230920 appears to disclose a wheeled platform adapted to accommodate at least one five-gallon bucket surrounded by a plurality of storage compartments for use by a tradesman such as a drywall installer, tile installer, auto detailer, and the like. The wheeled platform includes a rigid base, having a lower and an upper surface structurally interconnected by a plurality of structural ribs and flanges. The flanges extend upward from the upper surface of the base to define a plurality of compartments which are intended to be used to store materials and tools used by the tradesman in the performance of their work. The platform base and flange arrangement define at least one cylindrical compartment for receiving a five-gallon bucket. Four caster wheels are appropriately attached to the lower surface of the base so that the platform can be wheeled from a service vehicle to a specific job site having stored therein, the tradesman's tools, as well as necessary material supplies to perform daily job functions. A retainer arrangement is provided on either side of the bucket to create a biasing force to secure the bucket within the compartment of the wheeled platform. The retainer arrangement permits the bucket to be lifted by its handle so that the bucket and platform base secured thereto can be conveniently lifted over uneven terrain or up and down steps.

International Application Publication Number WO 2018/129316 appears to disclose a container transporter system, vehicle, and method. The container transporter can be automatically or manually controlled allowing for ease of use in moving a coupled container. The container transporter can be used with virtually any container, such as a refuse container. The automatic movement of the container transporter can assist users with time constrains or physical constraints in moving their refuse for pickup.

While the above-identified patents and publications do appear to disclose various sleds, their configurations remain non-desirous and/or problematic inasmuch as, among other things, none of the above-identified sleds enable a user to conveniently transport a waste container during snowy and/or inclement weather conditions without having to plow the waste container through the snow. Moreover, none of the above-identified sleds are compact, low-profile, and utilize the handle of the waste container to facilitate transportation of the same.

These and other objects of the present invention will become apparent in light of the present specification, claims, and drawings.

SUMMARY OF THE INVENTION

The present invention is directed to a sled for use in association with a waste container having a handle that enables a user to conveniently transport the waste container during snowy and/or inclement weather conditions, comprising, consisting essentially of, and/or consisting of: (a) a first ski, wherein the first ski comprises a top surface, a bottom surface, a front end, and a back end; and (b) a wheel binding associated with the top surface of the first ski, wherein the wheel binding is adapted to releasably secure a wheel of a waste container.

In a preferred embodiment of the present invention, the wheel binding includes a concave region that generally conforms to an outer peripheral geometry of a waste container wheel.

In another preferred embodiment of the present invention, the sled further comprises a first mounting bracket and a second mounting bracket associated with the top surface of the first ski.

In yet another preferred embodiment of the present invention, the sled further comprises a securement strap adjustably associated with the first and second mounting brackets.

In one embodiment of the present invention, a portion of the front end and/or the back end of the ski is bowed upward.

The present invention is also directed to a sled for use in association with a waste container having a handle that enables a user to conveniently transport the waste container during snowy and/or inclement weather conditions, comprising, consisting essentially of, and/or consisting of: (a) a first ski, wherein the first ski comprises a top surface, a bottom surface, a front end, and a back end; (b) a first wheel binding associated with the top surface of the first ski, wherein the first wheel binding is adapted to releasably secure a first wheel of a waste container; (c) a second ski, wherein the second ski comprises a top surface, a bottom surface, a front end, and a back end; and (d) a second wheel binding associated with the top surface of the second ski, wherein the second wheel binding is adapted to releasably secure a second wheel of a waste container.

The present invention is further directed to a sled in combination with a waste container that enables a user to conveniently transport the waste container during snowy and/or inclement weather conditions, comprising, consisting essentially of, and/or consisting of: (a) a waste container, wherein the waste container comprises a bottom wall, a front side wall, a back sidewall, a left side wall, a right side wall, a hingeably displaceable top wall, a handle member proximate the top wall and the rear side wall, and a first wheel and a second wheel; (b) a first ski, wherein the first ski comprises a top surface, a bottom surface, a front end, and a back end; (c) a first wheel binding associated with the top surface of the first ski, wherein the first wheel binding is adapted to releasably secure a first wheel of a waste container; (d) a second ski, wherein the second ski comprises a top surface, a bottom surface, a front end, and a back end; (e) a second wheel binding associated with the top surface of the second ski, wherein the second wheel binding is adapted to releasably secure a second wheel of a waste container; and (f) wherein the first wheel is secured to the first wheel binding, wherein the second wheel is secured to the second wheel binding, and wherein a user pushes and/or pulls the handle of the waste container to facilitate transportation of the same.

In a preferred embodiment of the present invention, the skis and components of the skis are fabricated from a metal, a metal alloy, a natural resin, a synthetic resin, a plastic, a composite, wood, and/or combinations thereof.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1-6 in particular, sled 10 is disclosed for use in association with waste container 12 having handle 14 that enables a user to conveniently transport the waste container during snowy and/or inclement weather conditions.

Sled 10 includes one or two ski(s) 16 comprising top surface 18, bottom surface 20, front end 22, back end 24, and wheel binding 26. Wheel binding 26 is associated with/ secured to top surface 18 of ski 16. Wheel binding 26 is adapted to releasably secure a wheel of waste container 12.

In accordance with the present invention, sled 10 may include a single ski or a pair of skis that are optionally secured together.

In a preferred embodiment of the present invention, wheel binding 26 includes concave region 28 that generally conforms to the outer peripheral geometry of the wheel of waste container 12.

In another preferred embodiment of the present invention, first and second mounting brackets 30 are associated with/ secured to top surface 18 of the ski.

In one embodiment of the present invention, securement strap 32 is adjustably associated with first and second mounting brackets 30. Securement strap or tie down 32 is preferably fabricated from an elastomeric material.

Preferably, front end 22 and back end 24 of the ski(s) are bowed upward.

Figure 1:
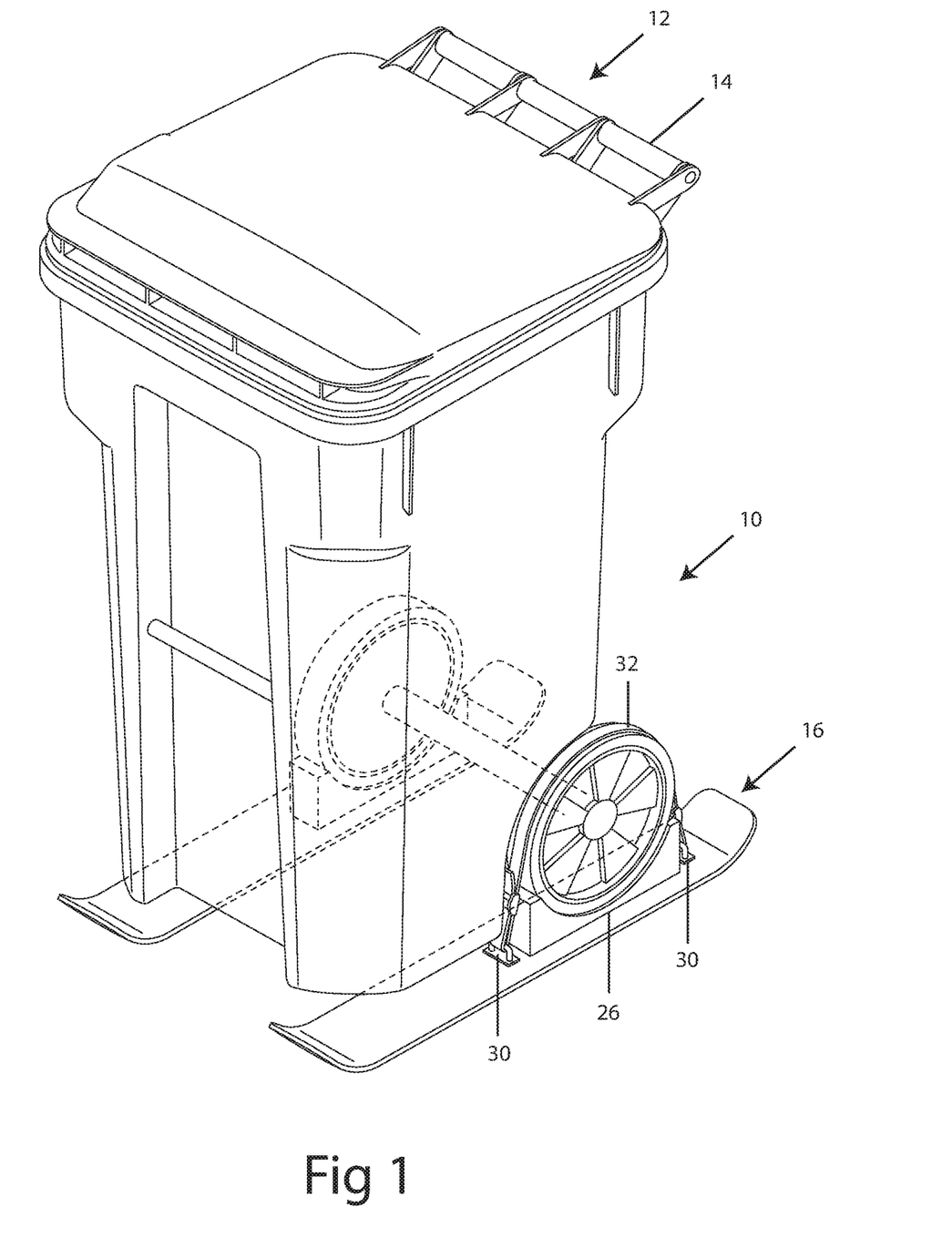
FIG. 1 of the drawings is a perspective view of a sled associated with a waste container in accordance with the present invention.
Figure 2:
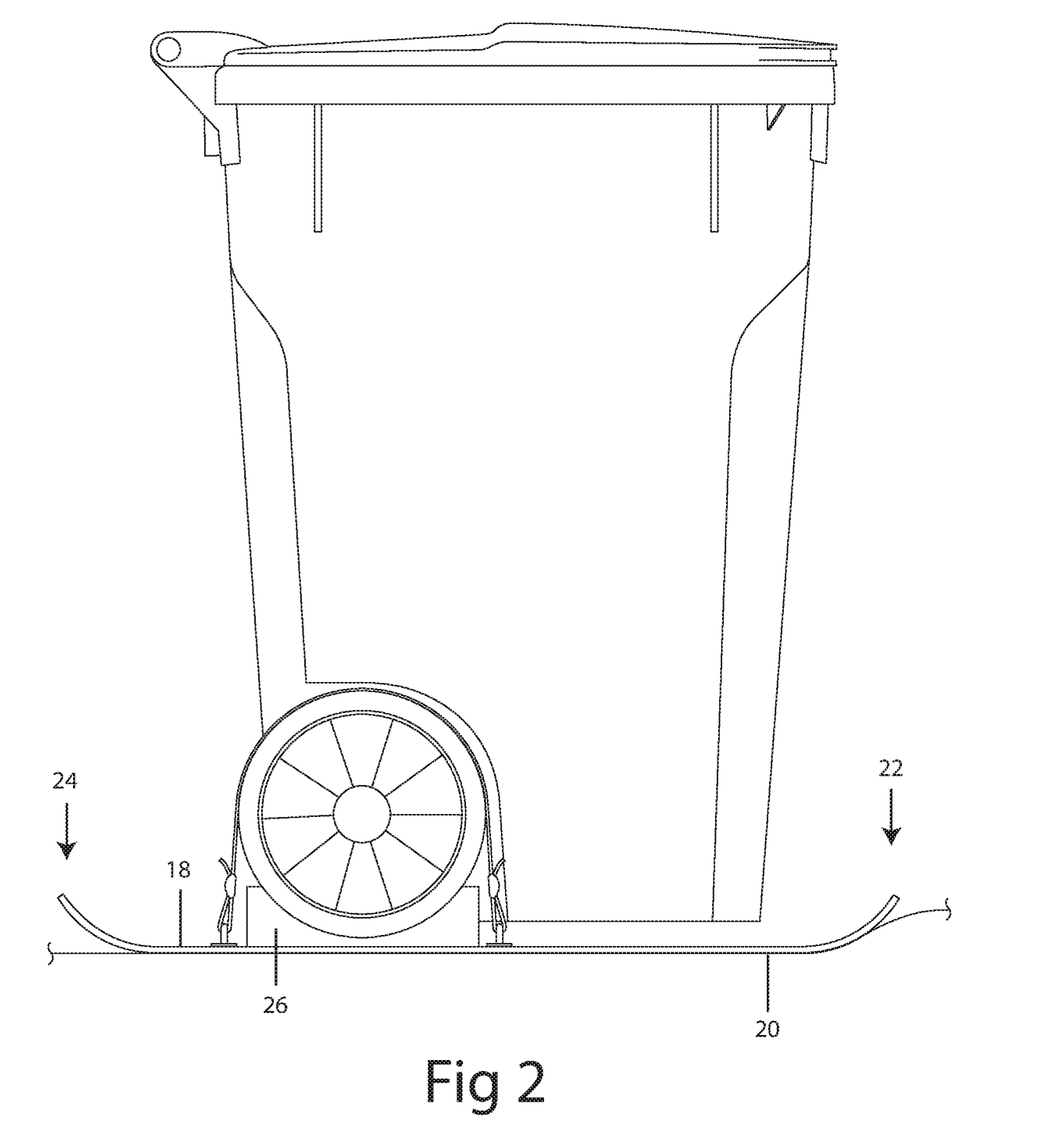
FIG. 2 of the drawings is a side view of the sled and waste container of FIG. 1.
Figure 3:
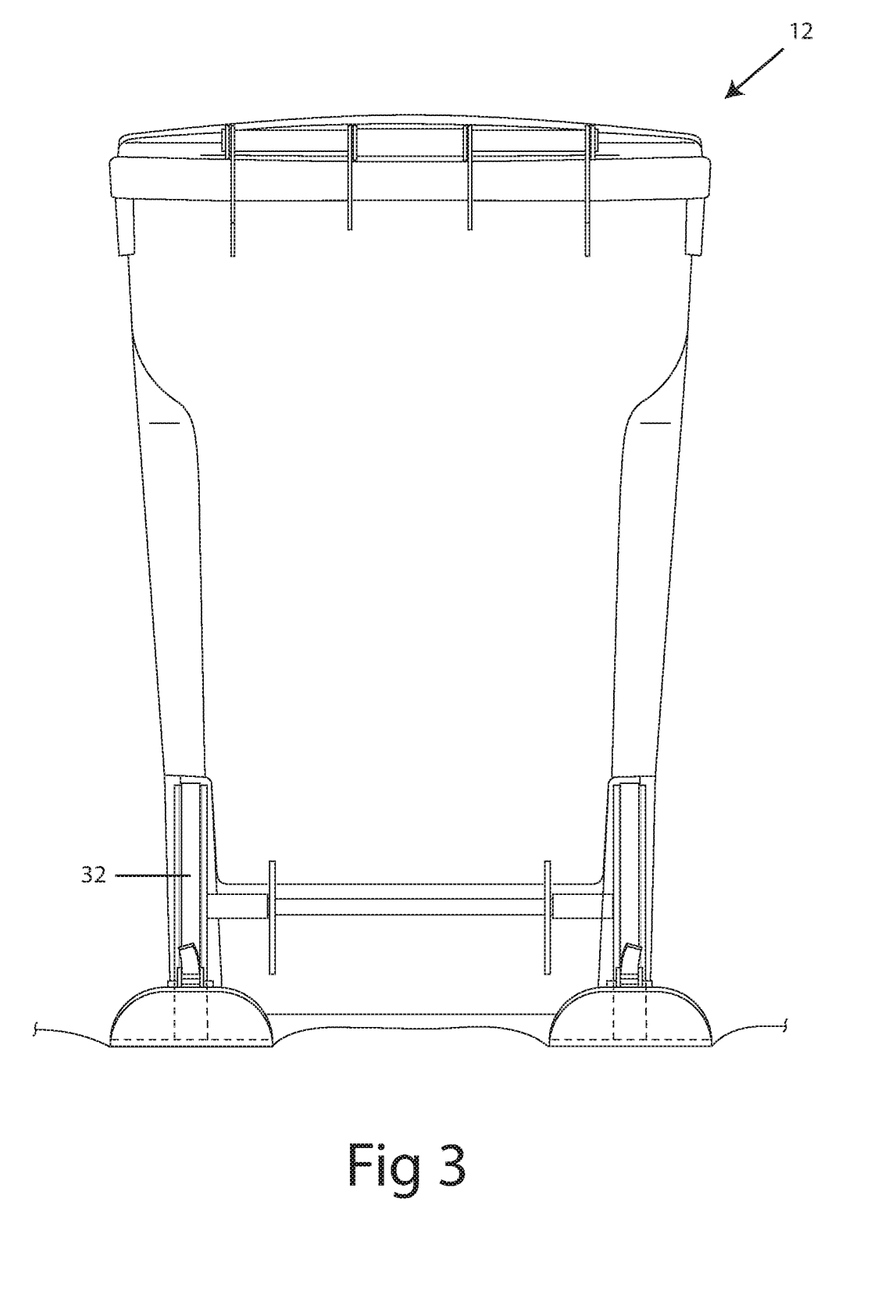
FIG. 3 of the drawings is a rear view of the sled and waste container of FIG. 1.
Figure 4:
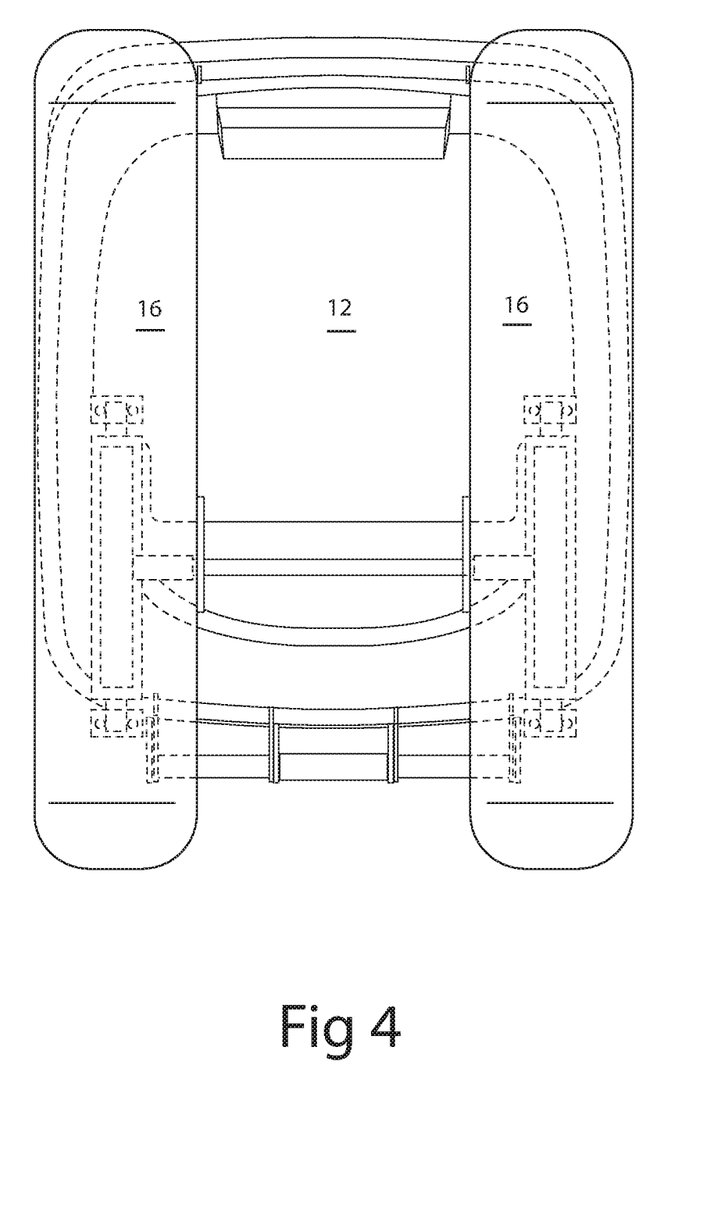
FIG. 4 of the drawings is a bottom view of the sled and waste container of FIG. 1.
Figure 5:
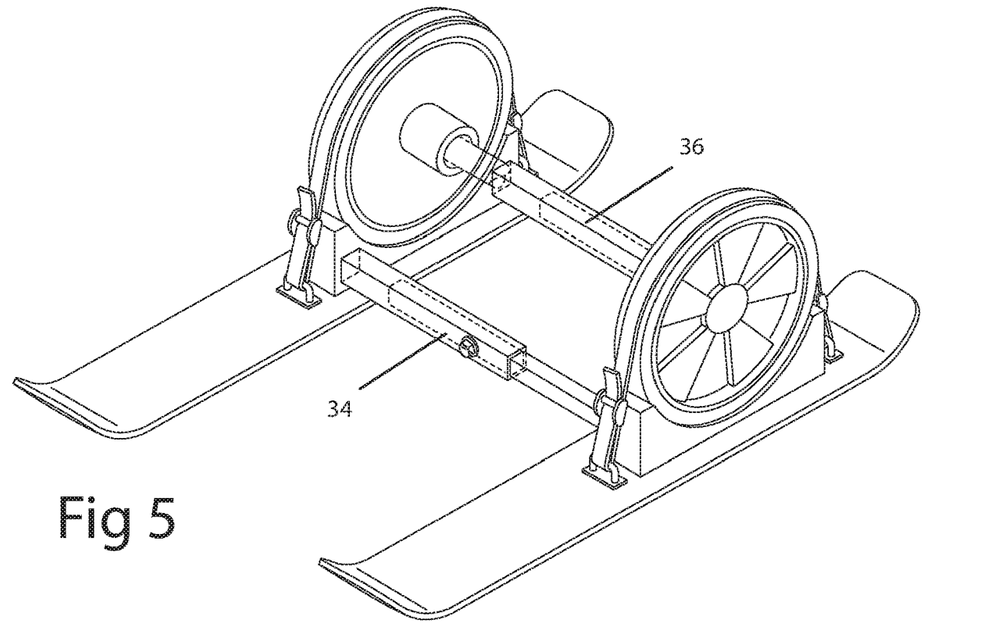
FIG. 5 of the drawings is a fragmented perspective view of a sled associated with a waste container in accordance with the present invention.
Figure 6:
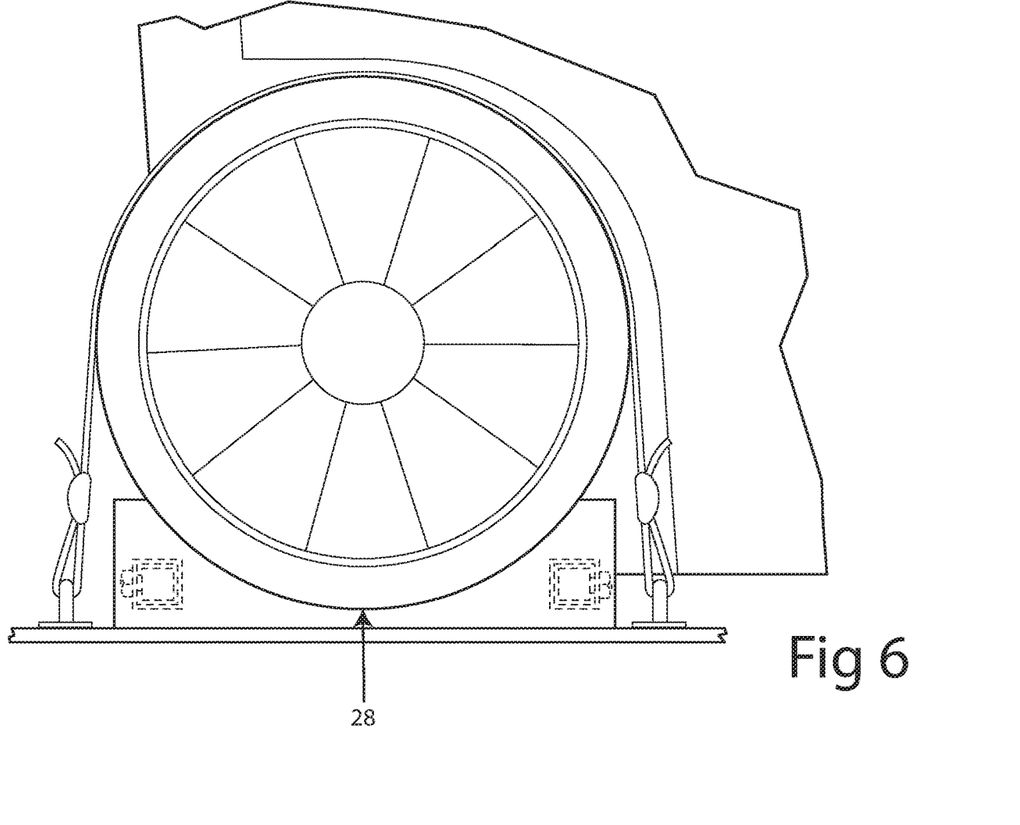
FIG. 6 of the drawings is a fragmented side view of the sled and waste container of FIG. 5.

When sled 10 utilizes two skis, first and second support members 34 and 36, respectively, are preferably secured to wheel binding 26 of the first and second skis.

Figure 7:
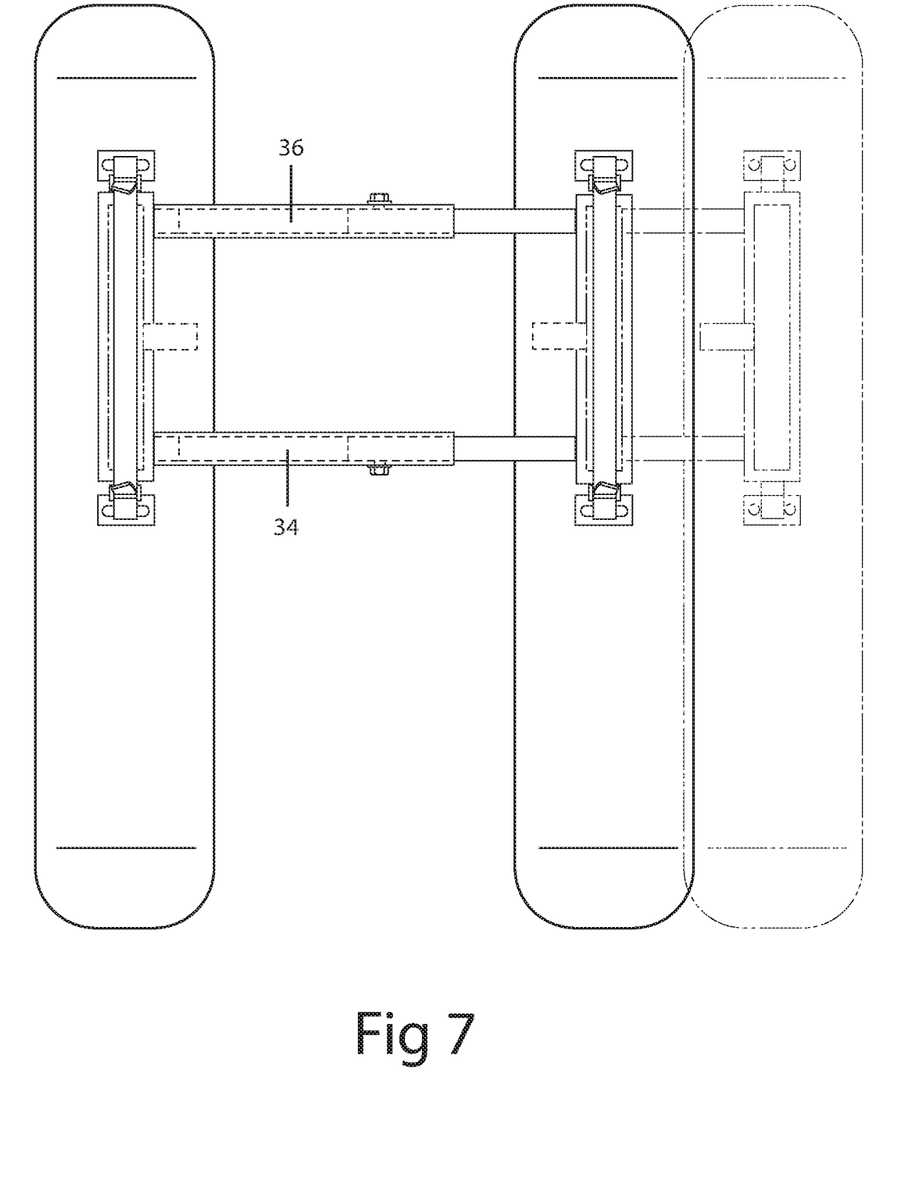
FIG. 7 of the drawings is a top view of the sled and waste container of FIG. 5 showing the adjustability of first and second support members.

Referring now to FIG. 7, first support member 34 and second support member 36 are controllably adjustable to space apart the first ski from the second ski.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A sled for use in association with a waste container having a handle that enables a user to conveniently transport the waste container during snowy and/or inclement weather conditions, comprising:
   a first ski, wherein the first ski comprises a top surface, a bottom surface, a front end, and a back end; and
   a wheel binding associated with the top surface of the first ski, wherein the wheel binding is adapted to releasably secure a wheel of a waste container, wherein the wheel binding includes a concave region that generally conforms to an outer peripheral geometry of a waste container wheel without covering the wheel during normal use; and
   a first horizontally disposed mounting bracket and a second horizontally disposed mounting bracket secured to the top surface of the first ski.

2. The sled according to claim 1, further comprising a securement strap adjustably associated with the first and second mounting brackets.

3. The sled according to claim 1, wherein a portion of the front end of the ski is bowed upward.

4. The sled according to claim 1, wherein a portion of the back end of the ski is bowed upward.

5. A sled for use in association with a waste container having a handle that enables a user to conveniently transport the waste container during snowy and/or inclement weather conditions, comprising:
   a first ski, wherein the first ski comprises a top surface, a bottom surface, a front end, and a back end;
   a first wheel binding associated with the top surface of the first ski, wherein the first wheel binding is adapted to releasably secure a first wheel of a waste container, wherein the first wheel binding includes a concave region that generally conforms to an outer peripheral geometry of the first wheel of the waste container without covering the first wheel during normal use;
   a second ski, wherein the second ski comprises a top surface, a bottom surface, a front end, and a back end;
   a second wheel binding associated with the top surface of the second ski, wherein the second wheel binding is adapted to releasably secure a second wheel of a waste container, wherein the second wheel binding includes a concave region that generally conforms to an outer peripheral geometry of the second wheel of the waste container without covering the second wheel during normal use; and
   a first horizontally disposed mounting bracket and a second horizontally disposed mounting bracket secured to the top surface of each one of the first and second skis.

6. The sled according to claim 5, further comprising a first support member secured to the first wheel binding and the second wheel binding.

7. The sled according to claim 6, wherein the first support member is controllably adjustable to space apart the first ski from the second ski.

8. The sled according to claim 6, further comprising a second support member secured to the first wheel binding and the second wheel binding.

9. The sled according to claim 8, wherein the second support member is controllably adjustable to space apart the first ski from the second ski.

10. The sled according to claim 5, further comprising a first support member secured to the first wheel binding and the second wheel binding, and a second support member secured to the first wheel binding and the second wheel binding.

11. The sled according to claim 10, wherein the first and second support members maintain the first and second skis in a spaced apart and parallel configuration.

12. A sled for use in association with a waste container having a handle that enables a user to conveniently transport the waste container during snowy and/or inclement weather conditions, consisting of:
- a first ski, wherein the first ski includes a top surface, a bottom surface, a front end, and a back end;
- a first wheel binding secured to the top surface of the first ski, wherein the first wheel binding is adapted to releasably secure a first wheel of a waste container, wherein the first wheel binding includes a concave region that generally conforms to an outer peripheral geometry of the first wheel of the waste container without covering the first wheel during normal use;
- a second ski, wherein the second ski includes a top surface, a bottom surface, a front end, and a back end;
- a second wheel binding secured to the top surface of the second ski, wherein the second wheel binding is adapted to releasably secure a second wheel of a waste container, wherein the second wheel binding includes a concave region that generally conforms to an outer peripheral geometry of the second wheel of the waste container without covering the second wheel during normal use;
- a first horizontally disposed mounting bracket and a second horizontally disposed mounting bracket secured to the top surface of the first ski;
- a first securement strap secured to the first and second mounting brackets;
- a third horizontally disposed mounting bracket and a fourth horizontally disposed mounting bracket secured to the top surface of the second ski;
- a second securement strap secured to the third and fourth mounting brackets; and
- a first support member secured to the first wheel binding and the second wheel binding, and a second support member secured to the first wheel binding and the second wheel binding.

* * * * *